United States Patent
Sekino et al.

(10) Patent No.: US 10,029,629 B2
(45) Date of Patent: Jul. 24, 2018

(54) CURVATURE REGULATION MEMBER, PROTECTIVE TUBE ASSEMBLY HAVING THE SAME, AND POWER SUPPLY DEVICE HAVING THE SAME

(71) Applicant: Yazaki Corporation, Tokyo (JP)

(72) Inventors: Tsukasa Sekino, Shizuoka (JP); Mitsunobu Kato, Shizuoka (JP); Tatsuya Otsuka, Shizuoka (JP); Masaki Yokoyama, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/793,906

(22) Filed: Oct. 25, 2017

(65) Prior Publication Data

US 2018/0126928 A1    May 10, 2018

(30) Foreign Application Priority Data

Nov. 8, 2016 (JP) .................................. 2016-218003

(51) Int. Cl.
| | |
|---|---|
| *B60J 5/06* | (2006.01) |
| *H02G 11/00* | (2006.01) |
| *B60R 16/02* | (2006.01) |
| *H02G 3/04* | (2006.01) |
| *B60R 16/023* | (2006.01) |

(52) U.S. Cl.
CPC ............ *B60R 16/0215* (2013.01); *B60J 5/06* (2013.01); *H02G 3/0468* (2013.01); *H02G 11/00* (2013.01); *B60R 16/0232* (2013.01)

(58) Field of Classification Search
CPC ... B60R 16/0215; B60R 16/027; F16G 13/16; H02G 3/0475; H02G 11/006; B60J 5/06
USPC ........................................................ 174/72 A
See application file for complete search history.

(56) References Cited

U.S. PATENT DOCUMENTS

| | | | | |
|---|---|---|---|---|
| 6,787,702 B2* | 9/2004 | Suzuki | ................... | H02G 11/00 |
| | | | | 174/72 A |
| 7,284,785 B2* | 10/2007 | Gotou | .................. | H02G 3/0475 |
| | | | | 174/72 A |
| 8,070,212 B2* | 12/2011 | Shima | ................. | B60R 16/0207 |
| | | | | 296/146.9 |

FOREIGN PATENT DOCUMENTS

| | | | |
|---|---|---|---|
| JP | 2003-025850 | * | 1/2003 |
| JP | 2013-162716 A | | 8/2013 |
| JP | WO 2014-045630 | * | 3/2014 |

* cited by examiner

*Primary Examiner* — Michael F McAllister
(74) *Attorney, Agent, or Firm* — Kenealy Vaidya LLP (57) ABSTRACT

A curvature regulation member to be inserted into a corrugated tube is made of synthetic resin, and integrally includes a belt, and a plurality of bridges standing from both ends in a width direction of the belt. The curvature regulation member is allowed to be curved in a direction that the belt is inside and the bridges are outside. In an opposite direction, curving of the curvature regulation member is restricted by the adjacent bridges abutting on each other. The bridge includes a rectangular plate. Two corners of the plate at a side away from the belt are rounded.

7 Claims, 5 Drawing Sheets

# CURVATURE REGULATION MEMBER, PROTECTIVE TUBE ASSEMBLY HAVING THE SAME, AND POWER SUPPLY DEVICE HAVING THE SAME

TECHNICAL FIELD

The present invention relates to a curvature regulation member for regulating a curvature of a protective tube such as a corrugated tube, and a protective tube assembly having the curvature regulation member, and a power supply device having the protective tube assembly.

BACKGROUND ART

Conventionally, in a vehicle having a sliding door, a power supply device for electrically connecting a vehicle body with the sliding door via a wiring harness is known (for example, refer to Patent Literature 1). In such a power supply device, for preventing a damage of the wiring harness, the wiring harness is protected by covering the wiring harness with a protective tube such as a corrugated tube.

CITATION LIST

Patent Literature

Patent Literature 1: JP 2013-162716 A

SUMMARY OF INVENTION

Technical Problem

Meanwhile, in a power supply device like above, when the sliding door is opened or closed, a protective tube through which a wiring harness is passed may be deformed, and a part of the protective tube may be curved in a shape bellying toward a vehicle body. There is a demand to suppress a belly toward the vehicle body. Therefore, in a field of the power supply device described above, a curvature regulation member able to regulate the curvature of the protective tube through which the wiring harness is passed in a direction of bellying toward the vehicle body is required.

Accordingly, in view of the above demand, an object of the present invention is to provide a curvature regulation member able to regulate a curvature of a protective tube protecting a wiring harness in a specific direction, and a protective tube assembly having the curvature regulation member, and a power supply device having the protective tube assembly.

Solution to Problem

To achieve the above object, according to a first aspect of the present invention, there is provided a curvature regulation member inserted into a protective tube for protecting a wiring harness and regulating a curvature of the protective tube, comprising:

a belt extending in a belt shape; and a plurality of bridges respectively standing from one end or both ends in a width direction of the belt and extending in a thickness direction and in the same direction of the belt, and arranged in a longitudinal direction of the belt, wherein the curvature regulation member is allowed to be curved in a direction that the belt is inside and the bridges are outside, and in an opposite direction, curving of the curvature regulation member is restricted by the adjacent bridges abutting on each other, wherein the bridge includes a rectangular plate, and wherein two corners of the plate at a side away from the belt are rounded.

According to a second aspect of the present invention, there is provided a protective tube assembly comprising:

a protective tube for protecting a wiring harness; and the curvature regulation member as described in the first aspect.

According to a third aspect of the present invention, there is provided the protective tube assembly as described in the second aspect, wherein ribs extending in the longitudinal direction of the belt are provided on outer faces of the plurality of bridges, wherein an end face away from the outer face of the plate of at least one of the ribs is a curved face projecting toward a side away from the outer face of the plate, and wherein said at least one of the ribs abuts on an inner face of the protective tube.

According to a fourth aspect of the present invention, there is provided the protective tube assembly as described in the third aspect, wherein the rib of a specific bridge in the plurality of the bridges only abuts on the inner face of the protective tube.

According to a fifth aspect of the present invention, there is provided a power supply device mounted on a vehicle having a vehicle body and a sliding member, comprising:

a wiring harness routed in between the vehicle body and the sliding member; and the protective tube assembly as described in any one of the second to the fourth aspects.

Advantageous Effects of Invention

According to the first aspect of the present invention, a curvature regulation member including: a belt extending in a belt shape; and a plurality of bridges respectively standing from one end or both ends in a width direction of the belt and extending in a thickness direction of the belt, and arranged in a longitudinal direction of the belt. Further, the curvature regulation member is allowed to be curved in a direction that the belt is inside and the bridges are outside, and in an opposite direction, curving of the curvature regulation member is restricted by the adjacent bridges abutting on each other. Thereby, the curvature regulation member able to regulate a curvature of a protective tube protecting a wiring harness in a specific direction can be provided. Further, because the bridge includes a rectangular plate, and two corners of the plate at a side away from the belt are rounded, when the protective tube is displaced, the protective tube can be displaced smoothly without catching the plate by the inner face of the protective tube. Therefore, the protective tube is prevented from being damaged, and a noise caused by the inner face of the protective tube and the plate grinding against each other is suppressed.

According to the second aspect of the present invention, the protective tube assembly able to regulate a curvature of the protective tube in a specific direction can be provided.

According to the third aspect of the present invention, because ribs extending in a longitudinal direction of the belt are provided on outer faces of the plurality of bridge, while the strength of the plate is improved, the plate is prevented from being caught when the protective tube is displaced. Further, because an end face away from the outer face of the plate of at least one of the ribs is a curved face projecting toward a side away from the outer face of the plate, and said at least one of the ribs abuts on an inner face of the protective tube, the curvature regulation member is prevented from fluttering in the protective tube, and a noise generation is prevented. Further, the plate is prevented from being caught when the protective tube is displaced. Furthermore, a gap between the inner face of the protective tube and the plate is closed with the rib to prevent electric wires of the wiring harness from entering the gap between the inner face of the protective tube and the plate.

According to the fourth aspect of the present invention, because the ribs of specific bridges in the plurality of the bridges only abut on the inner face of the protective tube, in addition to the effects that the curvature regulation member is prevented from fluttering in the protective tube, and electric wires of the wiring harness are prevented from entering the gap between the inner face of the protective tube, comparing with a case that all the ribs of the bridges abut on the inner face of the protective tube, a frictional force between the inner face of the protective tube and the ribs is reduced when assembling to insert the curvature regulation member into the protective tube. Thereby, an assembling operation becomes easy.

According to the fifth aspect of the present invention, the protective tube assembly able to regulate a curvature of the protective tube in a specific direction can be provided.

DESCRIPTION OF EMBODIMENTS

Hereinafter, a curvature regulation member, a protective tube assembly, and a power supply device according to an embodiment of the present invention will be explained.

Figure 1:
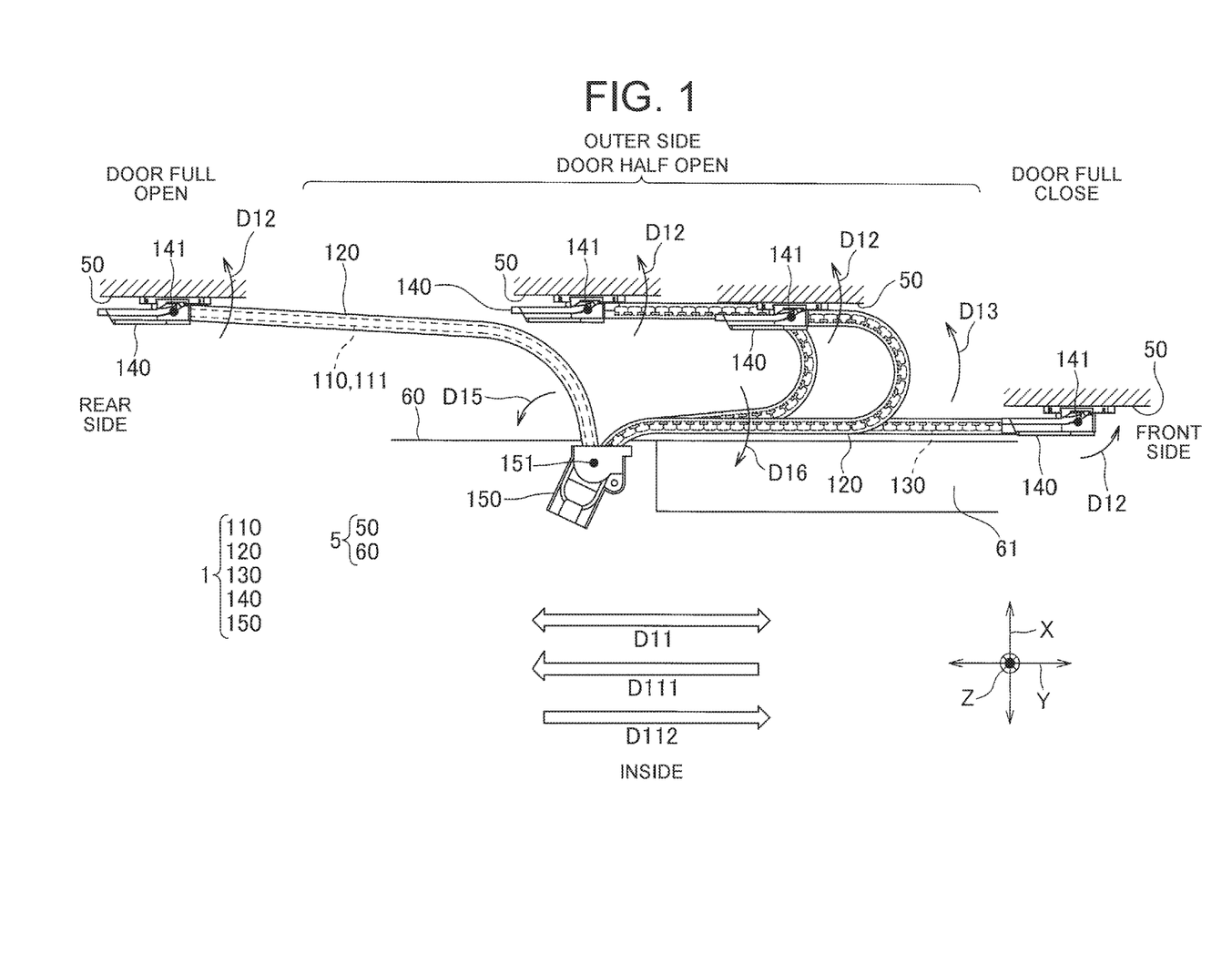
FIG. 1 is a schematic view showing a power supply device to which a curvature regulation member is applied according to an embodiment of the present invention.

FIG. 1 is a schematic view showing the power supply device to which the curvature regulation member is applied according to an embodiment of the present invention. The power supply device 1 of this embodiment is mounted on a vehicle 5 having a vehicle body 60 and a sliding door 50 as a sliding member. The power supply device 1 is a device for supplying electric power from a no-shown power source provided on the vehicle body 60 to a not-shown electrical device provided in the sliding door 50 via a wiring harness 110. Incidentally, in this FIG. 1, a right side in the figure corresponds to a front side of the vehicle 5, a left side in the figure corresponds to a rear side of the vehicle 5, an upper side in the figure corresponds to outside of the vehicle 5, and a lower side in the figure corresponds to inside of the vehicle 5. Namely, X direction in FIG. 1 is a lateral direction of the vehicle 5, Y direction in FIG. 1 is a longitudinal direction of the vehicle 5, and Z direction in FIG. 1 is a vertical direction of the vehicle 5.

The power supply device 1 includes: the wiring harness 110; a corrugated tube 120 as a protective tube; a curvature regulation member 130; a door-side holding portion 140; and a vehicle-body-side holding portion 150. Further, the corrugated tube 120 and the curvature regulation member 130 inserted thereto correspond to "a protective tube assembly" in claims.

The wiring harness 110 is made of a plurality of electric wires 111 bundled. The wiring harness 110 is inserted into the corrugated tube 120 in between the vehicle body 60 and the sliding door 50. The plurality of electric wires 111 may include not only a power line for supplying electric power but also a signal line for transmitting and receiving electric signals in between a not-shown control means provided on the vehicle body 60 and a not-shown electronic device provided in the sliding door 50.

Figure 3:
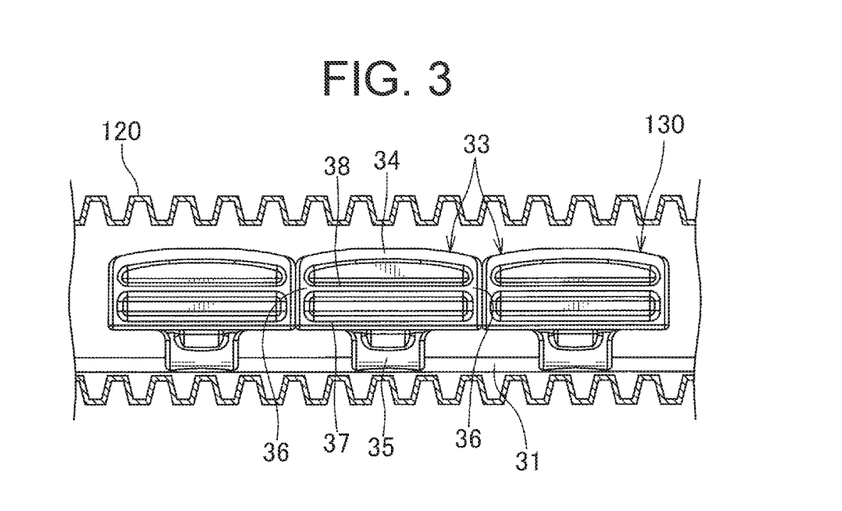
FIG. 3 is a schematic view of a straightly extending portion of the curvature regulation member shown in FIG. 1 and a corrugated tube.
Figure 4:
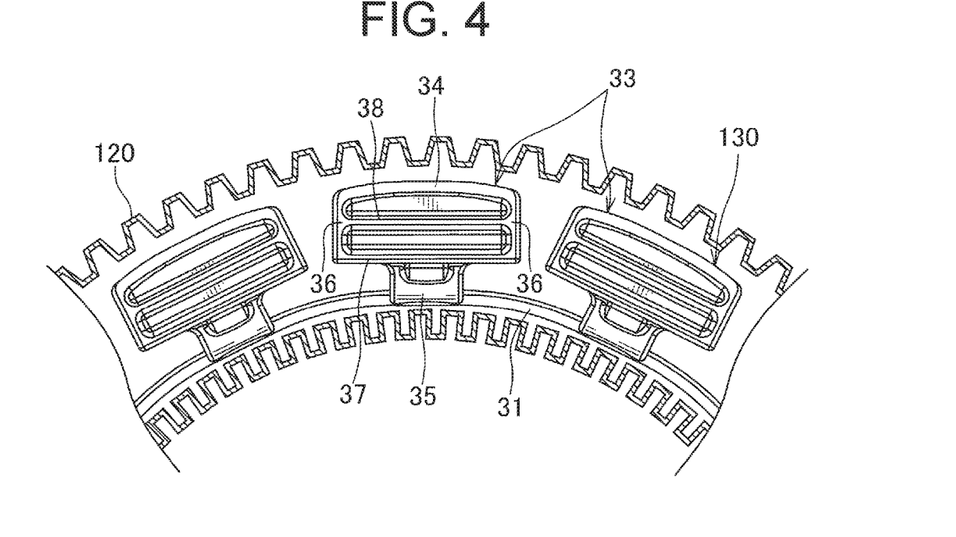
FIG. 4 is a schematic view of a curved portion of the curvature regulation member shown in FIG. 1 and the corrugated tube.

The corrugated tube 120 is a well-known wiring harness protective member made of synthetic resin, and has flexibility. Further, as shown in FIGS. 3 and 4, the corrugated tube 120 is formed in a bellows tube shape, having concaves and convexes on inner and outer faces thereof. Further, in FIGS. 3 and 4, only the corrugated tube 120 is shown in a sectional view, and the curvature regulation member 130 is shown in a plan view. This is for reasons of expediency to explain a shape of the curvature regulation member 130. Further, in FIGS. 3 and 4, a display of the wiring harness 110 is omitted.

The curvature regulation member 130 is inserted into the corrugated tube 120 for regulating curvatures of the corrugated tube 120 and the wiring harness 110. The curvature regulation member 130 will be explained in detail later.

As shown in FIG. 1, one end at a sliding door 50 side of the corrugated tube 120 is held in the door-side holding portion 140 swingably on an XY plane about a door-side swing shaft 141 extending in Z direction. The door-side holding portion 140 is fixed to the sliding door 50. One end at a sliding door 50 side of the wiring harness 110 extends out from the one end at a sliding door 50 side of the corrugated tube 120. Further, the wiring harness 110 also extends out from the door-side holding portion 140 via a not-shown path in the door-side holding portion 140, and then extends to the electronic device in the sliding door 50.

Further, as shown in FIG. 1, the other end at a vehicle body 60 side of the corrugated tube 120 is held in the vehicle-body-side holding portion 150 swingably on the XY plane about a vehicle-body-side swing shaft 151 extending in Z direction. The other end at a vehicle body 60 side of the wiring harness 110 extends out from the other end at a vehicle body 60 side of the corrugated tube 120. Further, the wiring harness 110 also extends out from the vehicle-body-side holding portion 150 via a not-shown path in the vehicle-body-side holding portion 150, and then extends to the not-shown power source and the control means in the vehicle body 60.

As shown in FIG. 1, when the sliding door 50 is fully closed, the door-side holding portion 140 is positioned at a front side of the vehicle 50 with respect to the vehicle-body-side holding portion 150. Further, the corrugated tube 120, namely, the wiring harness 110 therein extends substantially straight in between the vehicle-body-side holding portion 150 and the door-side holding portion 140.

When the sliding door 50 is opened in an open direction D111 where the sliding door 50 is moved backward of the vehicle 5, in an early stage thereof, the one end at a sliding door 50 side of the corrugated tube 120 swings forward of the vehicle 5 on the XY plane about the door-side swing shaft 141. A coil spring is provided on the door-side holding portion 140 for urging such a swing. This coil spring biases the one end at a sliding door 50 side of the corrugated tube 120 in a biasing direction D12. owing to such a swing of the corrugated tube 120, during the movement of the sliding door 50 in the open direction D111 afterward, namely, when the sliding door is half opened, the corrugated tube 120 is curved in a U-shape projecting forward of the vehicle 5 on the XY plane.

While the skidding door 50 is moved in the open direction D111, an arm at the sliding door 50 side formed in a U-shape of the corrugated tube 120 is extended straight to the front side of the vehicle 5 by the biasing force in the biasing direction D12 of the door-side holding portion 140. As the sliding door 50 is moved in the open direction D111, the arm at the sliding door 50 side formed in the U-shape of the corrugated tube 120 becomes longer and an arm at the vehicle body 60 side becomes shorter. Then, in a stage that the arm at the vehicle body 60 side becomes short to some extent, the other end at a vehicle body 60 side of the corrugated tube 120 swings to the rear side of the vehicle body 60 in a swing direction D15 on the XY plane about the vehicle-body-side swing shaft 151. Then, while keeping this state, the sliding door 50 is moved in the open direction D111 to reach a full open condition.

When the sliding door 50 is closed in a close direction D112 from the full open condition, the corrugated tube 120 follows operations opposite to the opening operations of the sliding door 50 described above. First, in an early stage thereof, the other end at a vehicle body 60 side of the corrugated tube 120 swings in a direction opposite to the swing direction D15. Thereby, the corrugated tube 120 becomes U-shaped on the XY plane. Then, the sliding door 50 continues to move in the close direction D112, and in a stage that the arm in the U-shape at the sliding door 50 side becomes short to some extent, the one end at a sliding door 50 side of the corrugated tube 120 swings toward the rear side of the vehicle 5 against the biasing force of the door-side holding portion 140. Then, while keeping this state, the sliding door 50 is moved in the close direction D112 to reach a full close condition while the corrugated tube 120 is extended straight.

Further, an end at the sliding door 50 side of a floor of the vehicle body 60 is one level lower and is a step 61 where a passenger steps when riding. When the sliding door 50 is opened or closed, the arm at the vehicle body 60 side of the corrugated tube 120 in the U-shape as described above passes near the step 61.

Here, in a field of the power supply device used in a vehicle having a sliding door, there is a request to prevent a belly of the corrugated tube toward a vehicle body when curved by closing or opening the sliding door. That is meant for avoiding the passengers stepping the corrugated tube on the step 61. Therefore, in this embodiment, a curvature regulation member 130 is used for regulating the curvature so as not to belly the corrugated tube 120 toward the vehicle body 60 (toward the step 61). This curvature regulation member 130 limits the corrugated tube 120 to curve only on the XY plane, and allows the corrugated tube 120 to curve to outside of the vehicle body 60 (curve in an allowing direction D13). On the other hand, the curvature regulation member 130 regulates the curvature of the corrugated tube 120 (curve in a regulation direction D16) more than a specific limit to inside of the vehicle body 60 (toward the step 61).

Figure 5:
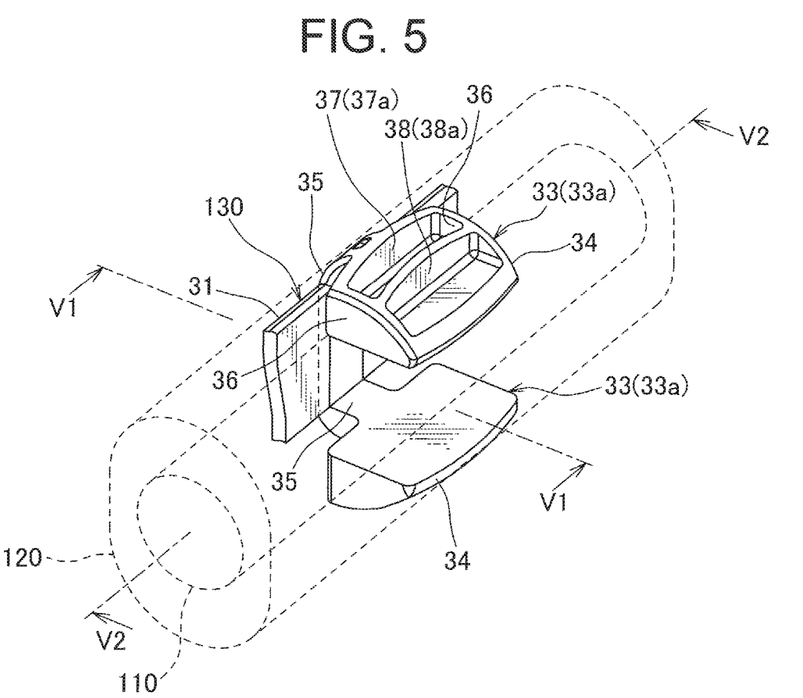
FIG. 5 is an explanatory view explaining a positional relationship among the curvature regulation member shown in FIG. 1, the corrugated tube, and a wiring harness.

As shown in FIGS. 1 and 5, the curvature regulation member 130 is arranged in between an inner face of the corrugated tube 120 and the wiring harness 110, surrounding the wiring harness 110 in a circumferential direction along the wiring harness 110. The curvature regulation member 130 has substantially the same length as the corrugated tube 120. Further, an end at the vehicle body 60 side of the curvature regulation member 130 is held by the vehicle-body-side holding portion 150 together with the end of the corrugated tube 120. An end at the sliding door 50 side of the curvature regulation member 130 is not held by the door-side holding portion 140.

Figure 2:
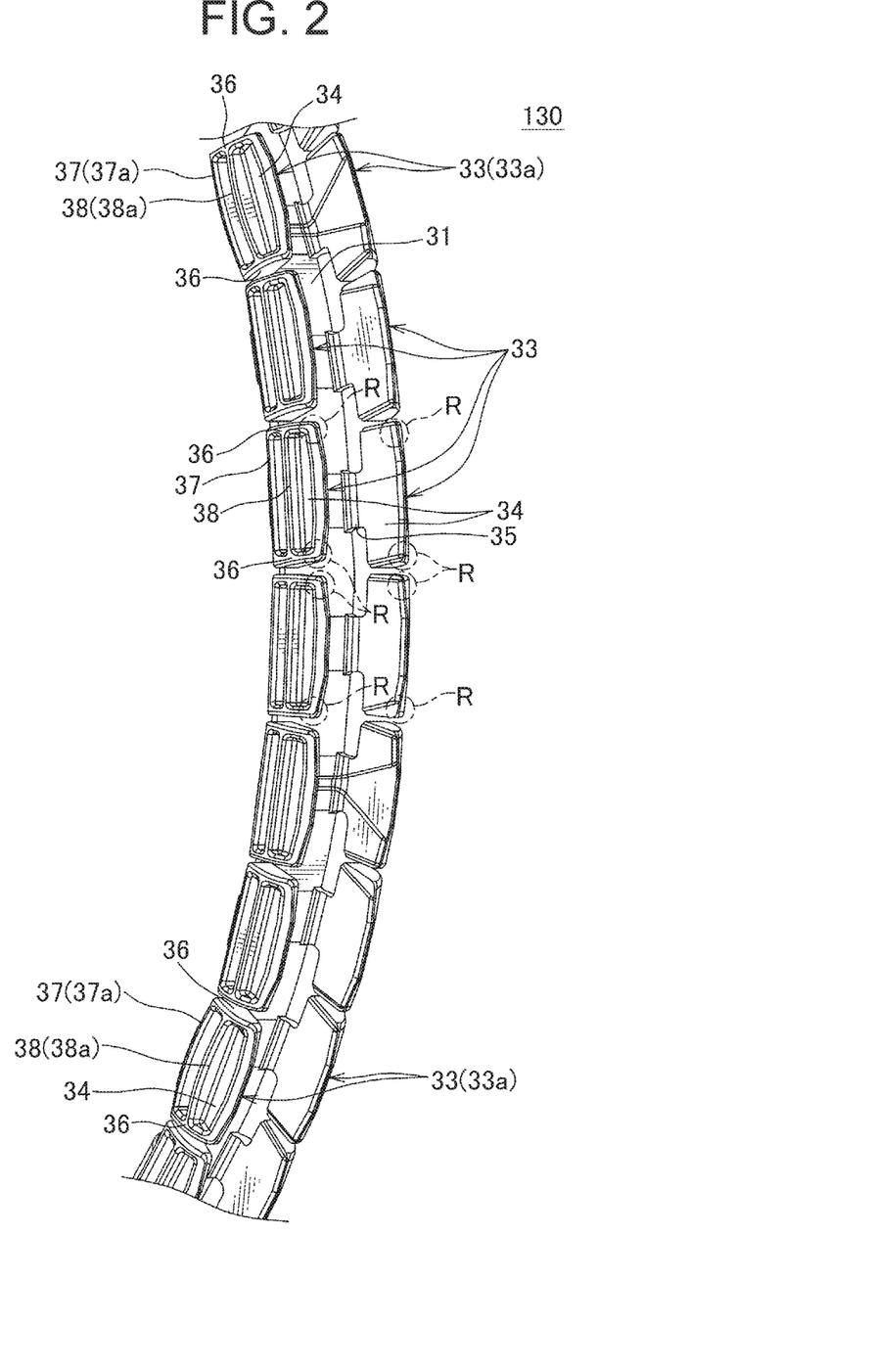
FIG. 2 is a perspective view of the curvature regulation member shown in FIG. 1.

The curvature regulation member 130 is made of synthetic resin, and as shown in FIG. 2, includes: a belt 31 extending in an axial direction of the corrugated tube 120; and a plurality of bridges 33. These belt 31 and bridges 33 are integrally molded. The plurality of bridges 33 respectively stands from both ends in a width direction of the belt 31, extends in a same thickness direction of the belt 31, and is arranged in a longitudinal direction of the belt 31. A sectional shape of the curvature regulation member 130 crossing the longitudinal direction of the belt 31 is formed in a C-shape by the belt 31 and two rows of bridges 33. The wiring harness 110 is positioned in between the two rows of bridges 33, namely, between the bridges 33 facing each other in the width direction of the belt 31.

As shown in FIGS. 2 to 4, the bridge 33 includes: a plate 34 formed in a quadrangle shape, and a neck 35 connecting the belt 31 and the plate 34. In this embodiment, the plate 34 is formed in a rectangular plate shape, a long side corresponds to a longitudinal direction of the belt 31, and a short side corresponds to a thickness direction of the belt 31. A width of the neck 35 (a size along the longitudinal direction of the belt 31) is formed narrower than a width of the plate 34, and a length of the neck 35 (a size along the thickness direction of the belt 31) is formed shorter than a length of the plate 34. Namely, the bridge 33 is formed in a T-shape in a plan view.

As shown in FIG. 4, the curvature regulation member 130 can be curved in a direction that the belt 31 is inside and the bridges 33 are outside when the bridges 33 adjacent to each other are separated and the belt 31 is elastically deformed. In an opposite direction, the curvature is regulated by the adjacent bridges abutting on each other. Specifically, in a part of the curvature regulation member 130 shown in FIG. 3, when the belt 31 is straight, the adjacent bridges 33 abut on each other at a side away from the belt 31, and the curvature regulation member 130 cannot be curved in a direction that the belt 31 is outside and the bridges 33 are inside. However, other than the embodiment shown, by designing that when the belt 31 is straight, the adjacent bridges 33 are arranged with a gap, the curvature regulation member 130 can be curved in a direction that the belt 31 is outside and the bridges 33 are inside. Actually, as shown in FIG. 1, the end at the vehicle body 60 side of the curvature regulation member 130 can be curved slightly in the direction that the belt 31 is outside and the bridges 33 are inside.

In this embodiment, the curvature regulation member 130 is configured such that when the belt 31 is straight, the adjacent bridges 33 abut on each other throughout a whole length thereof other than the end at the vehicle body 60 side. Namely, the curvature regulation member 130 is set straight in a limit state of the regulation direction D16 except a part near the vehicle-body-side holding portion 150. Thereby, the corrugated tube 120 and the wiring harness 110 are kept straight other than a part curved in the allowing direction D13. Further, the curvature regulation member 130 is arranged in the corrugated tube 120 such that a width direction of the belt is Z direction in FIG. 1. Thereby, this curvature regulation member 130 is restricted to be curved on the XY plane, and as a result, the corrugated tube 120 and the wiring harness 110 are restricted to be curved on the XY plane, too.

Next, a detailed shape of the bridge 33 will be explained. Two corners away from the belt 31 side of the plate 34 (indicated by "R" in FIG. 2) are rounded. Owing to such rounded shapes, when the corrugated tube 120 is displaced in association with opening or closing of the sliding door 50, the corrugated tube 120 can be displaced smoothly without the plate 34 caught by the inner face of the corrugated tube 120. Therefore, the corrugated tube 120 is prevented from being damaged, and a noise caused by the inner face of the corrugated tube 120 and the plate 34 grinding against each other is suppressed.

A plurality of ribs 36 to 38 are provided on an outer face (an opposite side to a side where the wiring harness 110 is positioned) of the plate 34. Two ribs 36 are provided on each plate 36, and these ribs 36 extend along two shorter sides of the plate 34. The rib 37 extends along longer side at the neck 35 side of two longer sides of the plate 34. The rib 38 is provided at the center of the plate 34, and extends parallel to the rib 37. In this way, the ribs 37 and 38 extend in a longitudinal direction of the belt 31. Owing to providing these ribs 36 to 38, the strength of the plate 34 is improved.

Figure 6:
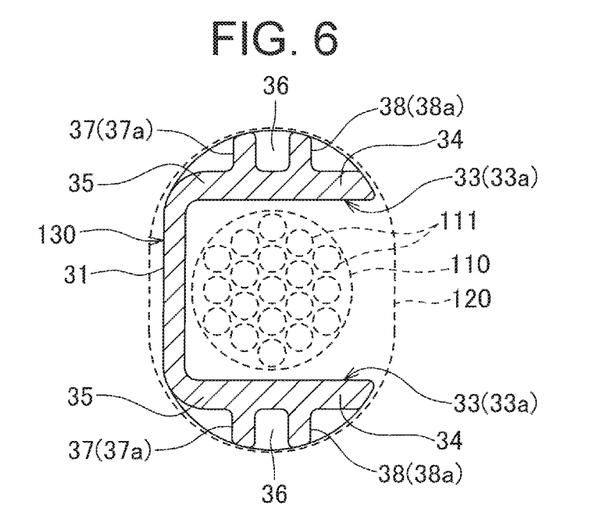
FIG. 6 is a sectional view taken on line V1-V1 of FIG. 5.
Figure 7:
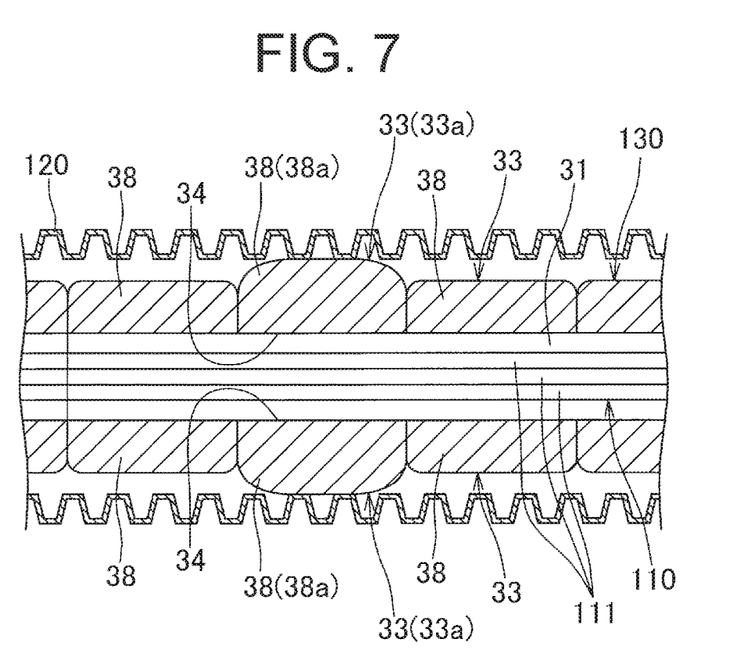
FIG. 7 is a sectional view taken on line V2-V2 of FIG. 5.

Further, as shown in FIGS. 2 and 5, end faces away from the outer face of the plate 34 of the ribs 37 and 38 (hereinafter, for differentiating from others, denote the reference signs 37a, 38a) provided on specific bridges 33 (hereinafter, for differentiating from others, denote the reference sign 33a on "the specific bridge 33") are projected toward a side away from the outer face of the plate 34. Then, as shown in FIGS. 6 and 7, these ribs 37a, 38a abut on the inner face of the corrugated tube 120. Incidentally, end faces away from the outer face of the plate 34 of the ribs 37, 38 of the bridges 33 other than the specific ribs 37a, 38a are flat, and the ribs 37, 38 do not abut on the inner face of the corrugated tube 120.

In this way, because the ribs 37a, 38a of the specific bridges 33a abut on the inner face of the corrugated tube 120, owing to vibrations when the vehicle 5 runs, the curvature regulation member 130 is prevented from fluttering in the protective tube 120, and a noise generation is prevented. Further, because the ribs 37a, 38a extends in the longitudinal direction of the belt 31, and the end faces of the ribs 37a, 38a are curved faces projecting toward a side away from the outer face of the plate 34, the plate 34 is prevented from being caught when the corrugated tube 120 is displaced. Further, a gap between the inner face of the corrugated tube 120 and the plate 34 is closed with the ribs 37a, 38a to prevent electric wires 111 of the wiring harness 110 from entering the gap between the inner face of the corrugated tube 120 and the plate 34. Further, because the ribs 37a, 38a of the specific bridges 33a in the plurality of the bridges 33 only abut on the inner face of the corrugated tube 120, comparing with a case that all the ribs 37, 38 of the bridges 33 abut on the inner face of the corrugated tube 120, a frictional force between the inner face of the corrugated tube 120 and the ribs 37a, 38a is reduced when assembling to insert the curvature regulation member 130 into the corrugated tube 120. Thereby, an assembling operation becomes easy.

Further, other than the configurations described above, in this embodiment, for preventing the electric wires 111 of the wiring harness 110 from entering a gap between the inner face of the corrugated tube 120 and the plate 34, as shown in FIG. 6, a gap between the inner face of the corrugated tube 120 and the end face away from the belt 31 side of the plate 34 is smaller than a diameter of the electric wire 111.

The curvature regulation member 130 explained above is allowed to be curved in the allowing direction D13, and hardly curved in the regulation direction D16 opposite to D13. Then, in the power supply device 1, this curvature regulation member 130 is arranged such that the curvature regulation member 130 cannot be curved in a desired direction to restrict the curvature of the corrugated tube 120. Thereby, the curvature of the corrugated tube 120 is restricted in the desired direction as the regulation direction D16. As a result, the curvature toward an inside of the vehicle body 60 in the regulation direction D16 of the arm at the vehicle body 60 side of the corrugated tube 120 turning in the U-shape when opening or closing the sliding door 50 is restricted by the curvature regulation member 130. The corrugated tube 120, of which curvature is restricted, is positioned slightly outside of the step 61 of the vehicle body 60. In this way, according to this embodiment, the belly of the corrugated tube 120 toward the step 61 side when opening or closing the sliding door 50 is restricted.

In the above embodiment, an example that the corrugated tube 120 is used as the protective tube is explained. However, in the present invention, a flexible tube having neither concave nor convex is formed on an inner face and an outer face thereof may be used as the protective tube.

In the above embodiment, a configuration that the plurality of bridges 33 stands from both ends in a width direction of the belt 31 is explained. However, in the present invention, the plurality of bridges 33 may stand from one end in a width direction of the belt 31.

In the above embodiment, the ribs 37a, 38a of the specific bridges 33a in the plurality of the bridges 33 only abut on the inner face of the corrugated tube 120. However, in the present invention, all the bridges 33 may abut on the inner face of the corrugated tube 120.

Incidentally, the embodiments described above slow only typical embodiments of the present invention. The present invention is not limited to these embodiments. Namely, various modifications can be practiced within an outline of the present invention. Of course, as long as having the curvature regulation member or the power supply device of the present invention, such a modification is included in a scope of the present invention.

REFERENCE SIGNS LIST

1 power supply device
5 vehicle
31 belt
33 bridge
34 plate
37 rib
38 rib
50 sliding door (sliding member)
60 vehicle body
110 wiring harness
120 corrugated tube (protective tube)
130 curvature regulation member

The invention claimed is:
1. A curvature regulation member inserted into a protective tube for protecting a wiring harness and regulating a curvature of the protective tube, comprising:
a belt extending in a belt shape; and a plurality of bridges respectively standing from one end or both ends in a width direction of the belt and extending in a thickness direction and in the same direction of the belt, and arranged in a longitudinal direction of the belt, wherein the curvature regulation member is allowed to be curved in a direction that the belt is inside and the bridges are outside, and in an opposite direction, curving of the curvature regulation member is restricted by the adjacent bridges abutting on each other, wherein the bridge includes a rectangular plate, and wherein two corners of the plate at a side away from the belt are rounded.

2. A protective tube assembly comprising:

a protective tube for protecting a wiring harness; and the curvature regulation member claimed in claim 1.

3. The protective tube assembly as claimed in claim 2, wherein ribs extending in the longitudinal direction of the belt are provided on outer faces of the plurality of bridges, wherein an end face away from the outer face of the plate of at least one of the ribs is a curved face projecting toward a side away from the outer face of the plate, and wherein said at least one of the ribs abuts on an inner face of the protective tube.

4. The protective tube assembly as claimed in claim 3, wherein the rib of a specific bridge in the plurality of the bridges only abuts on the inner face of the protective tube.

5. A power supply device mounted on a vehicle having a vehicle body and a sliding member, comprising:

a wiring harness routed in between the vehicle body and the sliding member; and the protective tube assembly claimed in claim 2.

6. A power supply device mounted on a vehicle having a vehicle body and a sliding member, comprising:

a wiring harness routed in between the vehicle body and the sliding member; and the protective tube assembly claimed in claim 3.

7. A power supply device mounted on a vehicle having a vehicle body and a sliding member, comprising:

a wiring harness routed in between the vehicle body and the sliding member; and the protective tube assembly claimed in claim 4.

* * * * *